(12) United States Patent
Hayashi

(10) Patent No.: US 9,282,316 B2
(45) Date of Patent: Mar. 8, 2016

(54) STEREOSCOPIC IMAGING DEVICE AND STEREOSCOPIC IMAGING METHOD

(71) Applicant: FUJIFILM Corporation, Tokyo (JP)

(72) Inventor: Kenkichi Hayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 385 days.

(21) Appl. No.: 13/789,016

(22) Filed: Mar. 7, 2013

(65) Prior Publication Data

US 2013/0182082 A1    Jul. 18, 2013

Related U.S. Application Data

(63) Continuation of application No. PCT/JP2011/063880, filed on Jun. 17, 2011.

(30) Foreign Application Priority Data

Sep. 10, 2010   (JP) .................. 2010-203394

(51) Int. Cl.
*H04N 13/02*     (2006.01)
*H04N 5/232*     (2006.01)
*H04N 13/00*     (2006.01)

(52) U.S. Cl.
CPC ......... *H04N 13/0203* (2013.01); *H04N 5/2328* (2013.01); *H04N 5/23212* (2013.01); *H04N 5/23258* (2013.01); *H04N 13/0022* (2013.01); *H04N 13/0217* (2013.01); *H04N 13/0257* (2013.01); *H04N 2209/045* (2013.01)

(58) Field of Classification Search
CPC .......... H04N 13/0022; H04N 13/0203; H04N 13/0217; H04N 13/0257; H04N 2209/045; H04N 5/23212; H04N 5/23258; H04N 5/2328; H04N 13/021; H04N 13/0239; H04N 13/0438; H04N 13/0296
USPC .......................................... 348/49
See application file for complete search history.

(56) References Cited

U.S. PATENT DOCUMENTS 3,712,199 A * 1/1973 Songer, Jr. .................... 396/324
5,872,590 A * 2/1999 Aritake et al. ................. 348/57

(Continued)

FOREIGN PATENT DOCUMENTS

JP   2000-20691 A   1/2000
JP   2005-45328 A   2/2005

(Continued)

OTHER PUBLICATIONS

Adelson et al, Single Lens Stereo with a Plenoptic Camera, Feb. 1992.*

*Primary Examiner* — Shan Elahi
(74) *Attorney, Agent, or Firm* — Birch, Stewart, Kolasch & Birch, LLP

(57) ABSTRACT

A stereoscopic imaging device, wherein the aperture controller performs a second aperture control in which the larger the amount of shake detected by the shake detector becomes, the further the amount of opening of the aperture unit decreases than the amount of opening required for the first aperture control. The present invention allows to deepen a depth of focus and decrease the amount of parallax by further closing an aperture as the amount of shake becomes larger, so that a stereoscopic effect is weakened when the amount of shake is large, thereby reducing an influence on viewers.

11 Claims, 11 Drawing Sheets

(56) References Cited

U.S. PATENT DOCUMENTS

| | | | |
|---|---|---|---|
| 6,163,337 A * | 12/2000 | Azuma et al. | 348/43 |
| 6,204,876 B1 * | 3/2001 | Uomori et al. | 348/47 |
| 6,496,598 B1 * | 12/2002 | Harman | 382/154 |
| 6,822,758 B1 | 11/2004 | Morino | |
| 7,180,536 B2 * | 2/2007 | Wolowelsky et al. | 348/42 |
| 7,292,280 B2 | 11/2007 | Yamazaki et al. | |
| 7,372,642 B2 | 5/2008 | Rohaly et al. | |
| 2001/0004298 A1 * | 6/2001 | Kobayashi | 359/462 |
| 2002/0021832 A1 * | 2/2002 | Dawson | 382/154 |
| 2002/0191841 A1 * | 12/2002 | Harman | 382/154 |
| 2004/0032980 A1 * | 2/2004 | Harman | 382/154 |
| 2007/0263087 A1 * | 11/2007 | Hong et al. | 348/14.13 |
| 2008/0165261 A1 | 7/2008 | Kamo | |
| 2008/0246759 A1 * | 10/2008 | Summers | 345/420 |
| 2011/0018978 A1 * | 1/2011 | Ego | 348/51 |

FOREIGN PATENT DOCUMENTS

| | | |
|---|---|---|
| JP | 2005-167310 A | 6/2005 |
| JP | 2008-20543 A | 1/2008 |
| JP | 2008-172321 A | 7/2008 |
| JP | 2008-187385 A | 8/2008 |
| JP | 2009-58966 A | 3/2009 |
| JP | 2009-527007 A | 7/2009 |
| JP | 2010-136269 A | 6/2010 |

* cited by examiner

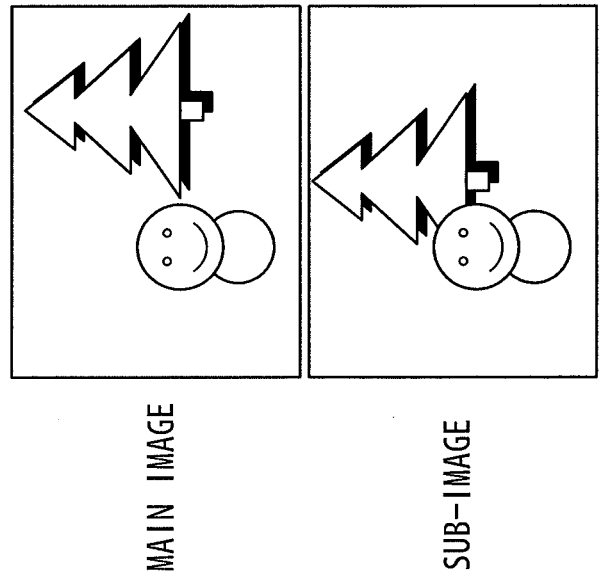
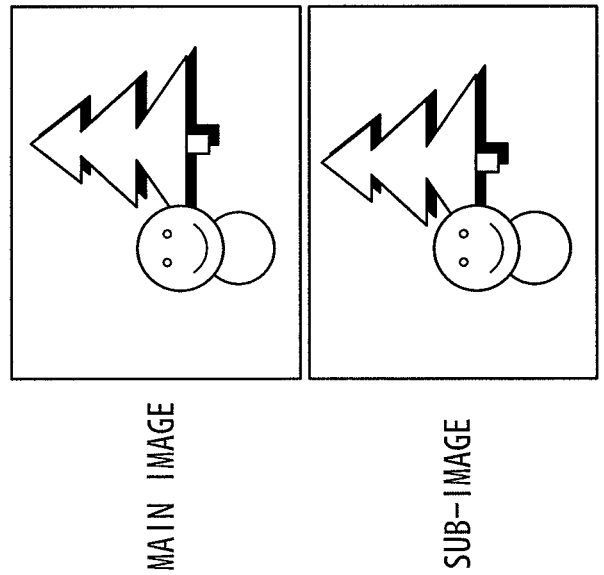
FIG. 6

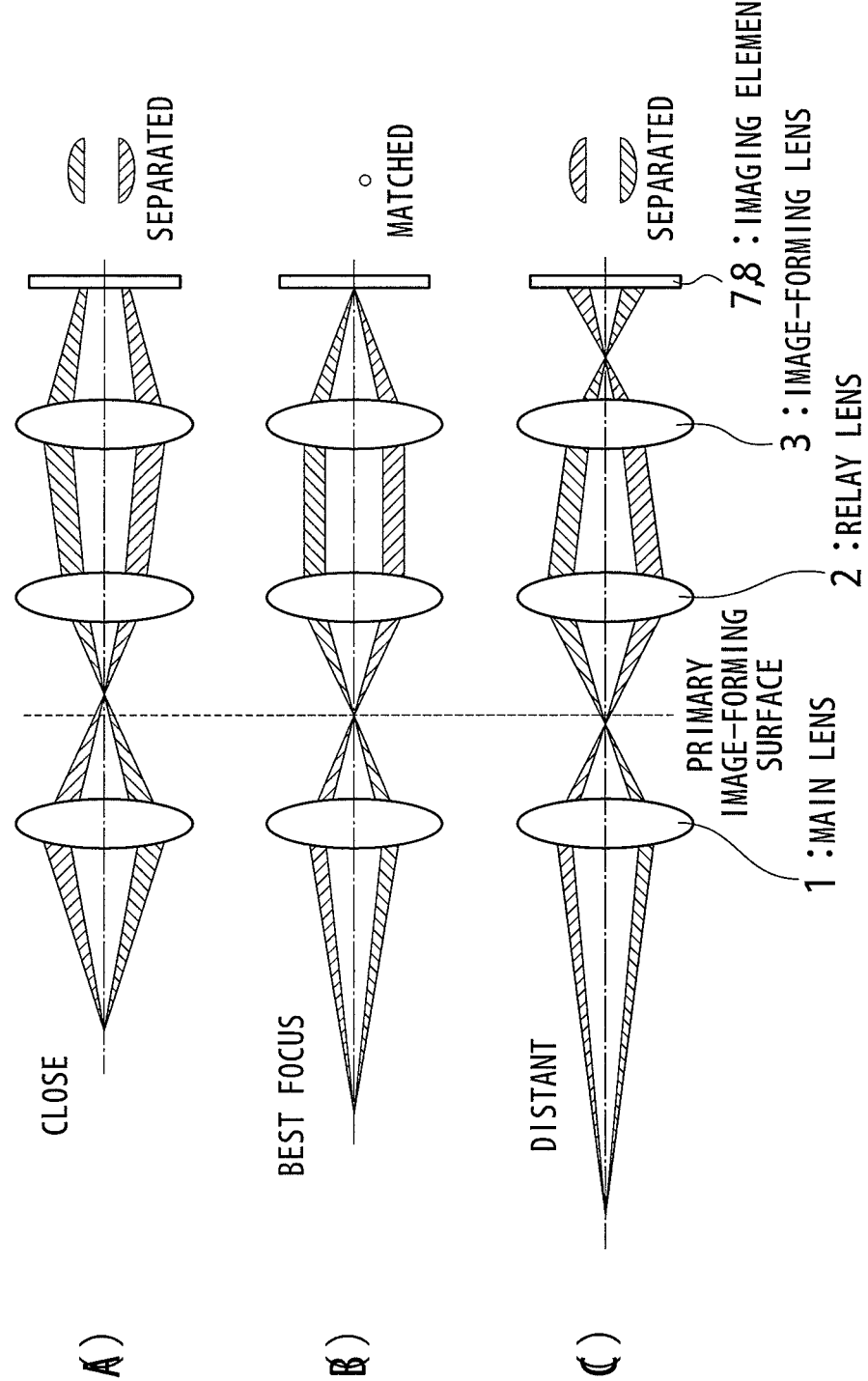

STEREOSCOPIC IMAGING DEVICE AND STEREOSCOPIC IMAGING METHOD

CROSS-REFERENCE TO RELATED APPLICATIONS

This application is a continuation application and claims the priority benefit under 35 U.S.C. §120 of PCT Application No. PCT/JP2011/063880 filed on Jun. 17, 2011 which application designates the U.S., and also claims the priority benefit under 35 U.S.C. §119 of Japanese Patent Application No. 2010-203394 filed on Sep. 10, 2010, which applications are all hereby incorporated by reference in their entireties.

TECHNICAL FIELD

The present invention relates to a stereoscopic imaging device and a stereoscopic imaging method, and more particularly, to a technique in which object images having passed through different regions in two directions of a photographing lens are imaged onto imaging elements to obtain different viewpoint images.

BACKGROUND ART

Conventionally, an imaging device having an optical system shown in FIG. 11 is known as a monocular stereoscopic imaging device (Patent Literature 1).

This optical system has a configuration in which object images having passed through different regions in the horizontal direction of a main lens 1 and a relay lens 2 are pupil-divided by a mirror 4 and are imaged onto imaging elements 7 and 8 through image-forming lenses 5 and 6, respectively.

FIGS. 12(A) to 12(C) show separate states of an image that is imaged onto an imaging element depending on difference among front-focus, in-focus (best focus), and back-focus. In FIG. 12, in order to compare the difference in the separate state by the focusing, the mirror 4 shown in FIG. 11 is omitted.

Among the pupil-divided images, images that are in focus are imaged (matched) at the same position on the imaging element as shown in FIG. 12(B), whereas images that are front and back focused are imaged (separated) at different positions on the imaging element as shown in FIGS. 12(A) and 12(C).

Accordingly, by obtaining object images pupil-divided in the horizontal direction via the imaging elements 7 and 8, a left viewpoint image and a right viewpoint image (3D image), in which viewpoints are different depending on an object distance, can be obtained.

Patent Literature 2 discloses an example of compound-eye stereoscopic imaging device. This imaging device measures a camera shake from a photographed 3D image. When the correction amount of camera shake exceeds a predetermined value, the imaging device determines that the 3D image is not suitable for a stereoscopic view and causes a 2D data creation unit to output photographed image data.

Patent Literature 3 discloses an example of a camera-shake correction mechanism of a compound-eye stereoscopic imaging device.

Patent literature 4 discloses an example of a camera-shake correction mechanism of a monocular camera equipped with a stereo adapter.

Patent Literature 5 discloses an example of a camera provided with an optical camera-shake correction mechanism. The amount of camera shake in a yaw direction $\omega x$ and the amount of camera shake in a pitch direction $\omega y$ can be obtained by calculating a displacement angle $\omega x$ and angular velocity $\omega x$ around the y-axis and a displacement angle $\omega y$ and angular velocity $\omega y$ around the x-axis from acceleration a1x and a2x in the x-axis direction and acceleration a1y and a2y in the y-axis direction, respectively.

It is known that when a body to be an object is imaged onto an imaging surface of an imaging element by using an optical system such as a zooming lens, blurring occurs in an image imaged by the imaging element compared to the original body due to an influence of aberration of the optical system, and the image quality is reduced. The intensity distribution of g of the then image is represented by $$g = f * h + n \quad (* \text{ expresses convolution integral}) \quad (A)$$

where noise n is added to the convolution of the luminance distribution f of the original body and the point spread function h that is indicative of the image-forming capability of the optical system. The elements g, h, and n being already known, the luminance distribution f of the original body can be calculated by the formula (A). The technique that removes blurring of an optical system by signal processing and obtains an ideal image like this is called "restoration", "reverse convolution", or "deconvolution" of the image. A restoration filter based on the point spread function (PSF) is generated in consideration of information of degradation of an image at the time of imaging such as an imaging condition (for example, exposure time, light exposure, a distance to an object, a focusing length) and characteristic information of an imaging device (for example, optical characteristics of a lens, identification information of an imaging device) (Patent Literature 6).

A degradation model based on blurring can be expressed as a function. For example, a blurring phenomenon can be expressed by a normal distribution using a distance (image height) from the center pixel as a parameter (Patent Literature 7).

Patent literature 8 discloses an example of aperture control of an imaging device. A camera is controlled to increase light quantity to a solid-state imaging element by using an extra maximum aperture at the time of photographing by electronic zooming. As a result, a shutter speed can be speeded up, and a camera shake can be prevented. Besides, the camera shake easily occurs as a focusing length of a photographic optical system is closer to the TELE side, however, little camera shake may be indistinctive when photographing is performed at a low resolution. Accordingly, the amount of blurring (the amount of shake) of an image due to the camera shake is calculated, the calculated amount of blurring and image performance data at the extra maximum aperture are compared, and then, in the case where the amount of blurring due to the camera shake exceeds the influence of degradation of the image performance, the photographing is performed in the balance point of the camera shake and the image performance by speeding up a shutter speed using the extra maximum aperture.

CITATION LIST

Patent Literature

{PTL 1} National Publication of International Patent Application No. 2009-527007
{PTL 2} Japanese Patent Application Laid-Open No. 2005-167310
{PTL 3} Japanese Patent Application Laid-Open No. 2008-20543

{PTL 4} Japanese Patent Application Laid-Open No. 2005-045328
{PTL 5} Japanese Patent Application Laid-Open No. 2010-136269
{PTL 6} Japanese Patent Application Laid-Open No. 2008-172321
{PTL 7} Japanese Patent Application Laid-Open No. 2000-020691
{PTL 8} Japanese Patent Application Laid-Open No. 2009-58966

SUMMARY OF INVENTION

Technical Problem

In a monocular stereoscopic imaging device that images a parallax image to generate a stereoscopic image by selectively obtaining image information having passed through different pupil positions of image-forming means, a parallax at a focus position becomes 0, and at a non-focus position, the parallax depending on the amount of defocus occurs. As a result, unfortunately, the amount of parallax of the stereoscopic image varies because the amount of defocus at the non-focus position is affected by a shake occurring due to, for example, a panning operation at the time of photographing.

The present invention has been accomplished in view of such circumstances, and its object is to generate a suitable stereoscopic image with respect to a shake condition at the time of photographing.

Solution to Problem

The present invention provides a stereoscopic imaging device that includes: an imaging unit capable of outputting a pair of images having a parallax, by pupil-dividing a light flux from an object into two light fluxes and imaging the two light fluxes onto two photoelectric conversion element groups corresponding to each flux to photoelectrically convert the two light fluxes; an aperture unit capable of adjusting an amount of light flux imaged onto the photoelectric conversion element groups of the imaging unit; a light-quantity detector detecting the amount of light flux; an aperture controller capable of performing a first aperture control controlling an amount of opening of the aperture unit so that a desired parallax is obtained according to the amount of light detected by the light-quantity detector; and a shake detector detecting an amount of shake of an object image at a time of photographing the images by the imaging unit, wherein the aperture controller performs a second aperture control in which the larger the shake amount detected by the shake detector becomes, the further the amount of opening of the aperture unit decreases than the amount of opening required for the first aperture control.

The stereoscopic imaging device includes a shake correction unit optically correcting a shake of the object image in response to the amount of shake detected by the shake detector, and a shake-amount determination unit determining whether or not the amount of shake detected by the shake detector falls within a range capable of shake correction by the shake correction unit, wherein the aperture controller performs the second aperture control when the shake-amount determination unit determines that the amount of shake falls without the range capable of shake correction.

The shake correction unit optically corrects the shake of the object image when the shake-amount determination unit determines that the amount of shake falls within the range capable of shake correction, and the aperture controller performs the first aperture control when the shake-amount determination unit determines that the amount of shake falls within the range capable of shake correction.

The stereoscopic imaging device includes a shake-direction detector detecting a direction of the shake of the object image and a shake-direction determination unit determining whether or not the direction of the shake detected by the shake-direction detector is coincident with a direction of the pupil-dividing, wherein the aperture controller performs the second aperture control when the shake-direction determination unit determines that the direction of the shake is coincident with the direction of pupil-dividing.

The aperture controller performs the first aperture control when the shake-direction determination unit determines that the direction of the shake is not coincident with the direction of the pupil-dividing.

The present invention provides a stereoscopic imaging method that performs the steps of: outputting a pair of images having a parallax, by pupil-dividing a light flux from an object into two light fluxes and imaging the two light fluxes onto two photoelectric conversion element groups corresponding to each flux to photoelectrically convert the two light fluxes; adjusting an amount of light flux imaged onto the photoelectric conversion element groups by an amount of opening of an aperture unit; detecting the amount of light flux; performing a first aperture control controlling the amount of opening of the aperture unit so that a desired parallax is obtained according to the detected amount of light; detecting an amount of shake of an object image at a time of photographing the images; and performing a second aperture control in which the larger the detected amount of shake becomes, the further the amount of opening of the aperture unit decreases than the amount of opening required for the first aperture control.

The present invention provide a stereoscopic imaging program that performs the steps of: outputting a pair of images having a parallax, by pupil-dividing a light flux from an object into two light fluxes and imaging the two light fluxes onto two photoelectric conversion element groups corresponding to each flux to photoelectrically convert the two light fluxes; adjusting an amount of light flux imaged onto the photoelectric conversion element groups by an amount of opening of an aperture unit; detecting the amount of light flux; performing a first aperture control controlling the amount of opening of the aperture unit so that a desired parallax is obtained according to the detected amount of light; detecting an amount of shake of an object at a time of photographing the images; and performing a second aperture control in which the larger the detected amount of shake becomes, the further the amount of opening of the aperture unit decreases than the amount of opening required for the first aperture control.

Advantageous Effects of Invention

The present invention allows to deepen a depth of focus and decrease the amount of parallax by further closing an aperture as the amount of shake becomes larger, so that a stereoscopic effect is weakened when the amount of shake is large, thereby reducing an influence on viewers.

BRIEF DESCRIPTION OF DRAWINGS

FIG. 6 is an image view showing a condition in which parallaxes of a main image and a sub-image vary by an aperture F-value.

FIG. 12 shows separate states of an image imaged onto an imaging element.

DESCRIPTION OF EMBODIMENTS

First Embodiment

Figure 1:
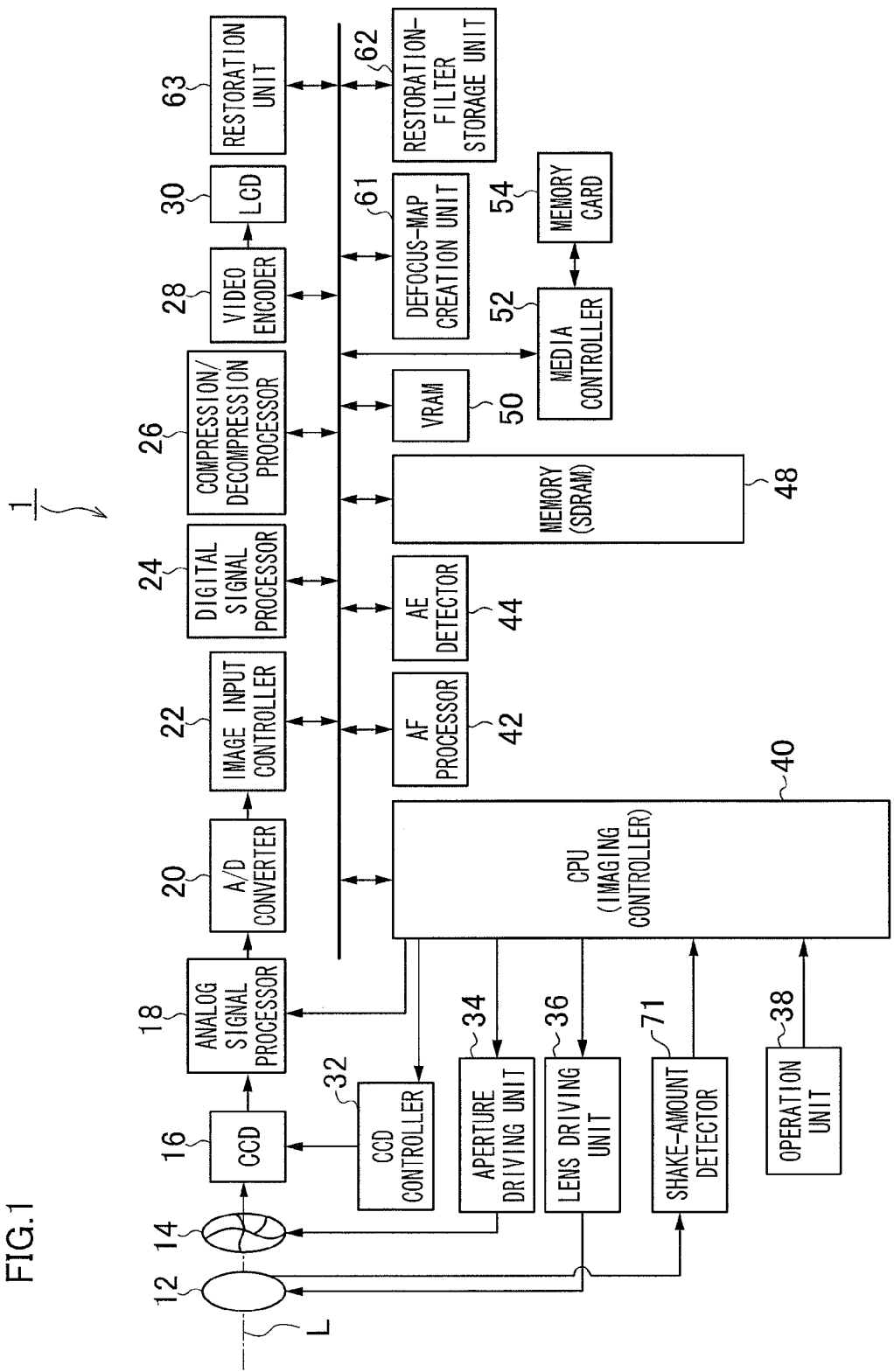
FIG. 1 is a block diagram of a monocular stereoscopic imaging device in accordance with a first embodiment.

FIG. 1 is a block diagram showing an embodiment of a monocular stereoscopic imaging device in accordance with a first embodiment.

This monocular stereoscopic imaging device 1 records an imaged image in a memory card 54, and an overall operation of the device is managed and controlled by a central processing unit (CPU) 40.

The monocular stereoscopic imaging device 1 is provided with an operation unit 38 having, for example, a shutter button, a mode dial, a playback button, a MENU/OK key, a cross key, and a BACK key. Signals from the operation unit 38 are input to the CPU 40. The CPU 40 controls circuits in the stereoscopic imaging device 1 on the basis of the input signals to perform, for example, lens driving control, aperture driving control, photograph operation control, image processing control, recording/playback control of image data, and display control of a stereoscopic liquid crystal monitor 30.

The shutter button is an operation button for inputting the direction of starting photographing and is configured by a second-stroke switch having an S1 switch that turns ON when half-pushing and an S2 switch that turns ON when full-pushing. The mode dial is means for selecting any of an auto photographing mode, a manual photographing mode, a seen position such as a person, a landscape, and a night scene for photographing a still image, and a moving-image mode for photographing a moving image.

The playback button is a button for switching to a playback mode for displaying, on a liquid crystal monitor 30, a still image or a moving image of a stereoscopic image (3D image) and a planar image (2D image) photographed and recorded. The MENU/OK key is an operation key having a function of a menu button instructing to display a menu on a screen of the liquid crystal monitor 30 and a function of an OK button instructing to determine and execute the selections. The cross key is an operation part for inputting an instruction in four directions of up, down, right, and left and serves as a button (cursor moving operation means) for selecting an item from the menu screen or instructing to select various setting items from each menu. Moreover, the up/down key of the cross key serves as a zoom switch at the time of photographing or a playback zoom switch in the playback mode, and the right/left key serves as a frame-by-frame advance (forward/backward advance) button in the playback mode. The BACK key is used, for example, to delete a desired item such as a selected item, to cancel an instruction, or to return to the previous operating state.

In the photographing mode, image light representing an object is imaged onto the light-receiving surface of a solid-state imaging element (hereinafter, referred to as "CCD") 16, which is a phase-difference image sensor capable of obtaining a pupil-dividing phase-difference image via an imaging lens 12 and an aperture 14. The imaging lens 12 is driven by a lens driving unit 36 controlled by the CPU 40 and performs, for example, a focus control and a zoom (focusing length) control. The aperture 14 is composed of, for example, five aperture blades, is driven by an aperture driving unit 34 controlled by the CPU 40, and the aperture value (F value) is controlled, for example, in five steps in every 1 AV from F 2.8 to F 11.

The CPU 40 controls the aperture 14 via the aperture driving unit 34 and also controls, for example, a charge storage time (shutter speed) in the CCD 16 and readout of image signals from the CCD 16 via a CCD controller 32.

Configuration Example of the CCD

Figure 2:
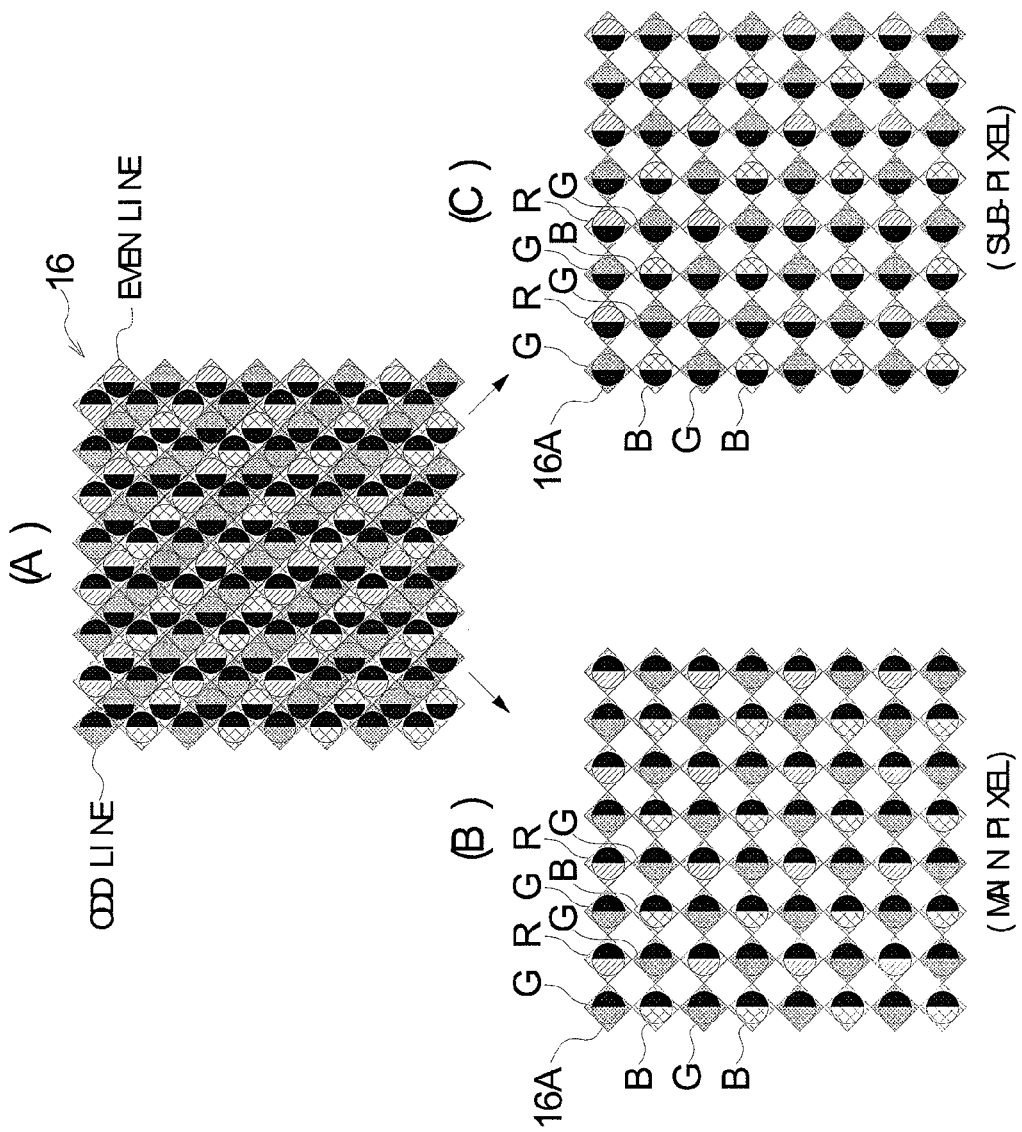
FIG. 2 shows configuration examples of a pupil-dividing parallax-image acquisition imaging element CCD.

FIG. 2 shows configuration examples of the CCD 16.

The CCD 16 has odd-line pixels (main pixels) and even-line pixels (sub-pixels) that are each arranged in a matrix form, so that two frames of image signals photoelectrically converted in these main and sub-pixels can be independently read out. A plurality of light-receiving elements corresponding to each pixel group form an effective pixel region for obtaining an effective image signal and an optical black region (hereinafter, referred to as "OB region") for obtaining a reference signal of a black level. Actually, the OB region is formed so as to surround the periphery of the effective pixel region.

As shown in FIG. 2, on the odd lines (1, 3, 5, . . . ) of the CCD 16, among the pixels having color filters of R (red), G (green), and B (blue), a line of a pixel arrangement of G, R, G, R . . . and a line of a pixel arrangement of B, G, B, G . . . are alternately arranged. On the other hand, on the even lines (2, 4, 6, . . . ), similarly to the odd lines, a line of a pixel arrangement of G, R, G, R . . . and a line of a pixel arrangement of B, G, B, G . . . are alternately arranged. The pixels on the odd lines are shifted in the arrangement direction by an amount of ½ pitch with respect to the pixels on the even lines.

Figure 3:
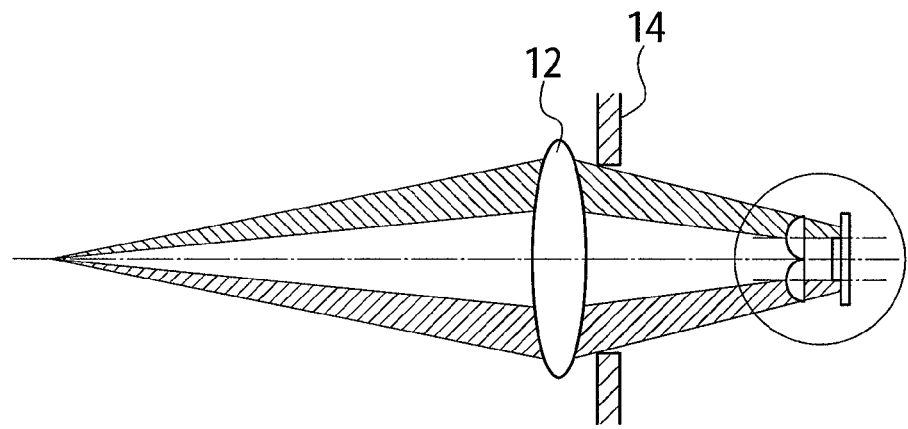
FIG. 3 shows one main pixel and one sub-pixel.
Figure 4:
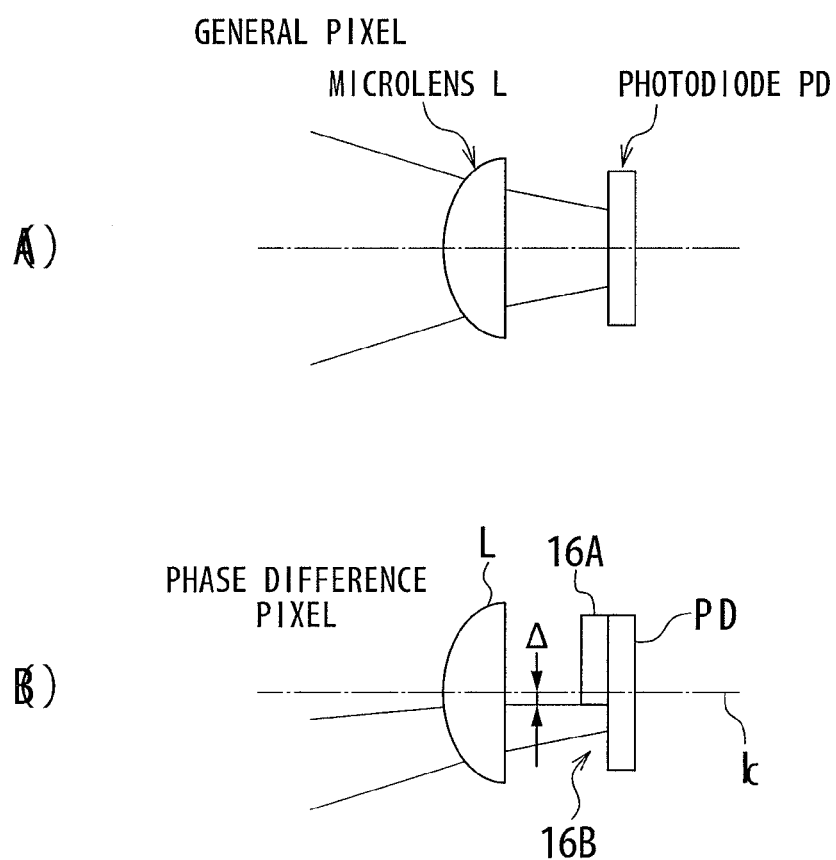
FIG. 4 is a magnified view of a main part of FIG. 3.

FIG. 3 shows the imaging lens 12, the aperture 14, and one main pixel and one sub-pixel of the CCD 16, and FIG. 4 shows a magnified view of a main part of FIG. 3.

As shown in FIG. 4(A), a light flux passing through an exiting pupil is incident on a general pixel (photodiode PD) of a CCD via a microlens L without being limited.

In contrast, as shown in FIG. 4 (B), a light-shielding member 16A is formed on the main pixel and the sub-pixel of the CCD 16. When imaging is performed with the monocular stereoscopic imaging device 1 transversely placed, the light-shielding member 16A shields the right or left half of the light-receiving surface of the main pixel and the sub-pixel (photodiode PD). Or, when imaging is performed with the monocular stereoscopic imaging device 1 vertically placed, the light-shielding member 16A shields the top or down half of the light-receiving surface of the main pixel and the sub-pixel (photodiode PD). In the position deviated away by a predetermine amount A toward the right direction, the left direction, the top direction, or the bottom direction (for example, in FIG. 4(B), the bottom direction below the optical axis Ic) from the optical axis Ic of the microlens L, an opening 16B of the light-shielding member 14A is provided. The light flux passes through the opening 16B, and then reaches the light-receiving surface of the photodiode PD. Thus, the light-shielding member 16A functions as a pupil-dividing member.

Figure 11:
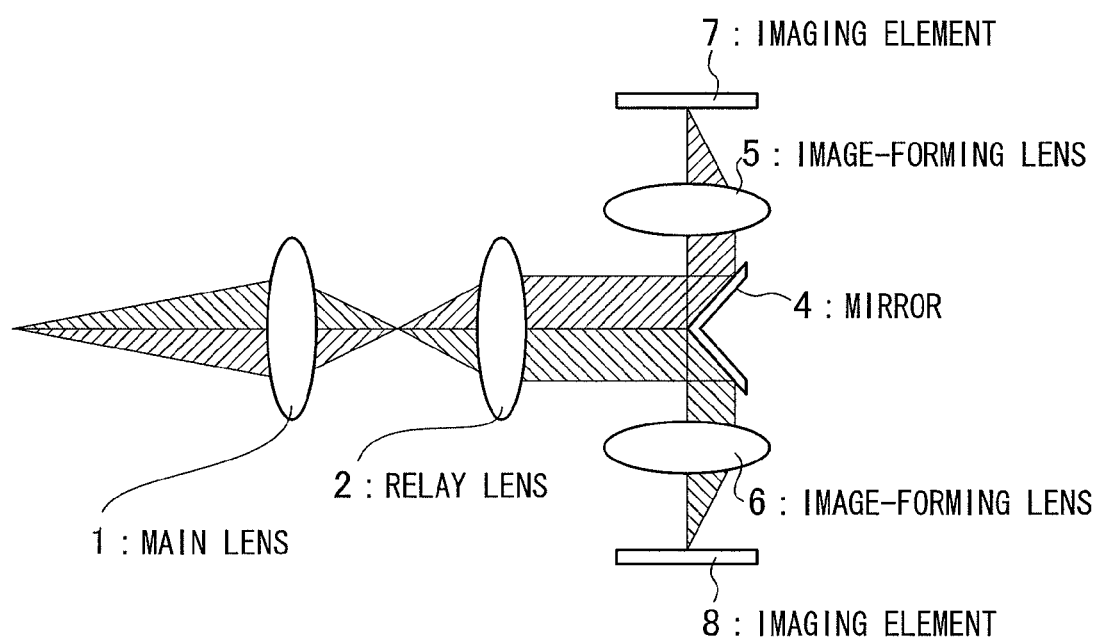
FIG. 11 shows an example of a conventional monocular stereoscopic imaging device.

There is a difference between the main pixel and the sub-pixel in terms of the region (the right/left half or the top/bottom half) where the light flux is limited by the light-shielding member 16A. For example, when the left half of the light flux is limited in the main pixel and the right half of the light flux is limited in the sub-pixel, a right viewpoint image is obtained from the main pixel and a left viewpoint image is obtained from the sub-pixel. Alternatively, when the top half of the light flux is limited in the main pixel and the bottom half of the light flux is limited in the sub-pixel, a bottom viewpoint image is obtained from the main pixel and a top viewpoint image is obtained from the sub-pixel. In the CCD 16 with the above configuration, although there is a difference between the main pixel and the sub-pixel in terms of the region (the right or left half) where the light flux is limited by the light-shielding member 16A, the configuration of the CCD 16 is not limited to this. For example, the light-shielding member 16A may not be provided, and the microlens L and the photodiode PD may be relatively shifted to each other in the horizontal direction so that the light flux being incident on the photodiode PD is limited in accordance with the shifting direction. Additionally, one microlens may be provided for two pixels (main pixel and sub-pixel) so that the light flux being incident on each pixel is limited, or the light flux is pupil-divided by a mirror (for example, FIG. 11). Moreover, the pupil division number may be two or more (for example, 4, 9, 16, . . . ).

Returning to FIG. 1, the signal charges stored in the CCD 16 is read out as a voltage signal according to the signal charges on the basis of a readout signal applied from the CCD controller 32. The voltage signal read out from the CCD 16 is applied to an analog signal processor 18, in which the R, G, and B signals for each pixel are subjected to sample-and-hold processing and amplification, and then are applied to an A/D converter 20. The A/D converter 20 converts the sequentially applied R, G, and B signals into digital R, G, and B signals and outputs them to an image input controller 22.

A digital signal processor 24 performs predetermined signal processing on the digital image signal input via the image input controller 22. The signal processing includes, for example, offset processing, gain control processing including white balance correction and sensitivity correction, gamma-correction processing, and YC processing.

Here, as shown in FIGS. 2(B) and 2(C), main image data read out from the main pixels on the odd lines of the CCD 16 are processed as left viewpoint image data, and sub-image data read out from the sub-pixels on the even lines are processed as right viewpoint image data.

The left viewpoint image data and the right viewpoint image data (3D image data) processed by the digital signal processor 24 are input to a VRAM 50. The VRAM 50 includes an A region and a B region in which 3D image data representing 3D images corresponding to one frame are stored. In the VRAM 50, the 3D image data representing the 3D images corresponding to one frame are alternately overwritten in the A region and the B region. Of the A and B regions of the VRAM 50, 3D image data being overwritten are read out from a region other than the region where 3D image data are overwritten. The 3D image data read out from the VRAM 50 are encoded by a video encoder 28 and are output to the stereoscopic liquid crystal monitor (LCD) 30 provided on the rear surface of a camera, thereby displaying the 3D object image on the display screen of the liquid crystal monitor 30.

Although the liquid crystal monitor 30 is stereoscopic display means capable of displaying stereoscopic images (left viewpoint image and right viewpoint image) as directional images having predetermined directivity with a parallax barrier, the configuration of the liquid crystal monitor 30 is not limited to this. For example, the liquid crystal monitor 30 may be one that uses a lenticular lens and one that enables users to see the left viewpoint image and the right viewpoint image individually by wearing dedicated glasses such as polarization glasses or liquid crystal shutter glasses.

When the shutter button of the operation unit 38 is in the state of a first-stage pressure (half push), the CPU 40 starts an AF operation and an AE operation and controls via the lens driving unit 36 so that the focusing lens in the imaging lens 12 is at the focusing position. Moreover, the image data output from the A/D converter 20 at the time of the half-push state of the shutter button are taken into an AE detector 44.

The AE detector 44 integrates the G signals of the entire screen or integrates the G signals subjected to differential weighting to the central portion of the screen and the peripheral portion, and outputs the integrated value to the CPU 40. The CPU 40 calculates the brightness (photographic Ev value) of an object from the integrated value received from the AE detector 44. The CPU 40 determines, based on the photographic Ev value, the aperture value of the aperture 14 and the electronic shutter (shutter speed) of the CCD 16 in which correct exposure is obtained, in accordance with a predetermined program diagram. The CPU 40 controls the aperture 14 on the basis of the determined aperture value via the aperture driving unit 34 (normal aperture control) and controls the charge storage time in the CCD 16 on the basis of the determined shutter speed via the CCD controller 32. The bright of the object may be calculated based on a photometry sensor in the outside.

Here, the predetermined program diagram is a drawing in which a photographic (exposure) condition is designed, which is composed of a combination of an aperture value of the aperture 14 and a shutter speed of the CCD 16 or a combination of these and a photographic sensitivity (ISO sensitivity) depending on the brightness (photographic Ev value) of the object. By photographing using the photographic condition determined in accordance with the program diagram, the main image and the sub-image having a desired parallax can be photographed regardless of the brightness of the object.

For example, a predetermined program diagram is designed so that the F value is set at a constant value of 1.4 (AV=1), and when the photographic EV value ranges from 7 to 12, only the shutter speed varies from 1/60 second (TV=6) to 1/2000 second (TV=11) depending on the photographic EV value. When the photographic EV value is less than 7 (becomes dark), the program diagram is also designed so as to increment the ISO sensitivity from 100 to 200, 400, 800, 1600, and 3200 every time the photographic EV value is decreased by 1 EV with the F value fixed to 1.4 and the shutter speed fixed to 1/60 second. Thus, when the object becomes dark, the brightness is compensated by an increase in the shutter speed or the ISO sensitivity without fully opening the aperture 14.

Since the parallax becomes weak when the F value to be fixed is set to be large and the parallax becomes strong when the F value to be fixed is set to be small, it is desirable that the F value to be fixed and the program diagram are changed depending on the parallax specified by users via the operation unit 38. For example, the normal aperture control is performed based on a program diagram A of the F value=5.6 when the weak parallax is specified, on a program diagram B of the F value=2.8 when the normal parallax is specified, and on a program diagram C of the F value=14 when the strong parallax is specified.

In this parallax-priority program diagram, the F value is fixed at a constant value, so that a main image and a sub-image having a desired parallax can be photographed. Although when the photographic EV value is larger than 12 (when the shutter speed reaches the maximum value), the images cannot be photographed due to overexposure, photographing can be performed by adding a configuration capable of automatically inserting an ND filter to reduce the amount of light to the monocular stereoscopic imaging device 1, even if the photographic EV value is larger than 12.

The AF processor 42 is a unit that performs contrast AF processing or phase-difference AF processing. When the contrast AF processing is performed, the AF processor 42 extracts high-frequency components of image data in a predetermined focus region of at least one of the left-viewpoint image data and the right-viewpoint image data and integrates the high-frequency components to calculate an AF estimate value representing a focused state. The AF control is performed so that the focusing lens in the imaging lens 12 is controlled to maximize the AF estimate value. On the other hand, when the phase-difference AF processing is performed, the AF processor 42 detects phase difference between image data corresponding to the main pixel and sub-pixel in the predetermined focus region of the left-viewpoint image data and right-viewpoint image data and calculates the amount of defocus on the basis of information representing the phase difference. The focusing lens in the imaging lens 12 is controlled so that the amount of defocus becomes 0, whereby the AF control is performed.

When the AE operation and the AF operation are finished, and the shutter button is in the state of a second-stage pressure (full push), in response to the pressing, the two frames of image data of the left-viewpoint image (main pixel image) and the right-viewpoint image (sub-pixel image) corresponding to the main pixel and sub-pixel output from the A/D converter 20 are input from the image input controller 22 to a memory (SDRAM) 48 and are temporarily stored in the memory 48.

The two frames of image data temporarily stored in the memory 48 are appropriately read out by the digital signal processor 24, where the read image data are subjected to predetermined signal processing including generation processing (YC processing) of luminance data and chrominance data of the image data. The image data subjected to the YC processing (YC data) are stored in the memory 48 again. Subsequently, the two frames of YC data are output to a compression/decompression processor 26 and are subjected to predetermined compression processing such as JPEG (joint photographic experts group), and then are stored in the memory 48 again.

From the two frames of YC data (compressed data) stored in the memory 48, a multipicture file (MP file: a type of file in which a plurality of images are coupled) is generated, and the MP file is read out by a media controller 52 and is recorded in a memory card 54.

A defocus-map creation unit 61 calculates the phase difference corresponding to the main pixel and the sub-pixel not only in each of small regions included in the predetermined focus region but also in each of a plurality of small regions substantially covering the entire effective pixel region. The plurality of small regions substantially covering the entire effective pixel region does not need to fully cover the entire effective pixel region, and may be tightly or loosely arranged to one another over the entire effective pixel region. For example, the phase difference is calculated in each of divided regions in which the effective pixel region is divided in a matrix shape by a predetermined unit (for example, 8×8 pixels), by a unit lower than the predetermined unit (for example, 1×1 pixel), or by a unit larger than the predetermined unit (for example, 10×10 pixels). Or, the phase difference is calculated in each of the divided regions of the predetermined unit at a predetermined pitch (for example, one divided region, more than one divided region or less than one divided region) from the outer periphery of the effective pixel region. Thus, the phase difference is calculated over the entire effective pixel region, however, may not always need to be calculated in all the small regions constituting the effective pixel region.

The defocus-map creation unit 61 determines the amount of defocus corresponding to each of the small regions on the basis of the phase difference calculated in each of the small regions. The set of the defocus amount corresponding to each of the small regions, which is determined over the entire effective pixel region, is called a defocus nap. The defocus-map creation unit 61 has a nonvolatile memory media such as a RAM, and temporally stores the determined defocus map. The defocus-map creation unit 61 may detect a feature point and a corresponding point between viewpoint images and may create the defocus map on the basis of the difference of position information between the feature point and the corresponding point.

A restoration-filter storage unit 62 is composed of a nonvolatile memory media such as a ROM and stores restoration filters corresponding to an image height (a distance from the center of an image, typically a distance from the optical-axis center L of the imaging lens 12) and the amount of defocus (or an object distance) of each small region in each viewpoint image.

A restoration unit 63 deconvolves the small regions by using the restoration filters selected for each small region of each viewpoint image and restores the small regions of the corresponding viewpoint images.

A shake-amount detector 71 is shake-amount detecting means adopted by an optical camera-shake correction mechanism. For example, similar to Patent Literature 5, the shake-amount detector 71 is composed of, for example, a vibratory gyro-sensor and detects the amount of shake by detecting an angular velocity around the horizontal axis and an angular velocity of the vertical axis of a camera.

Figure 5:
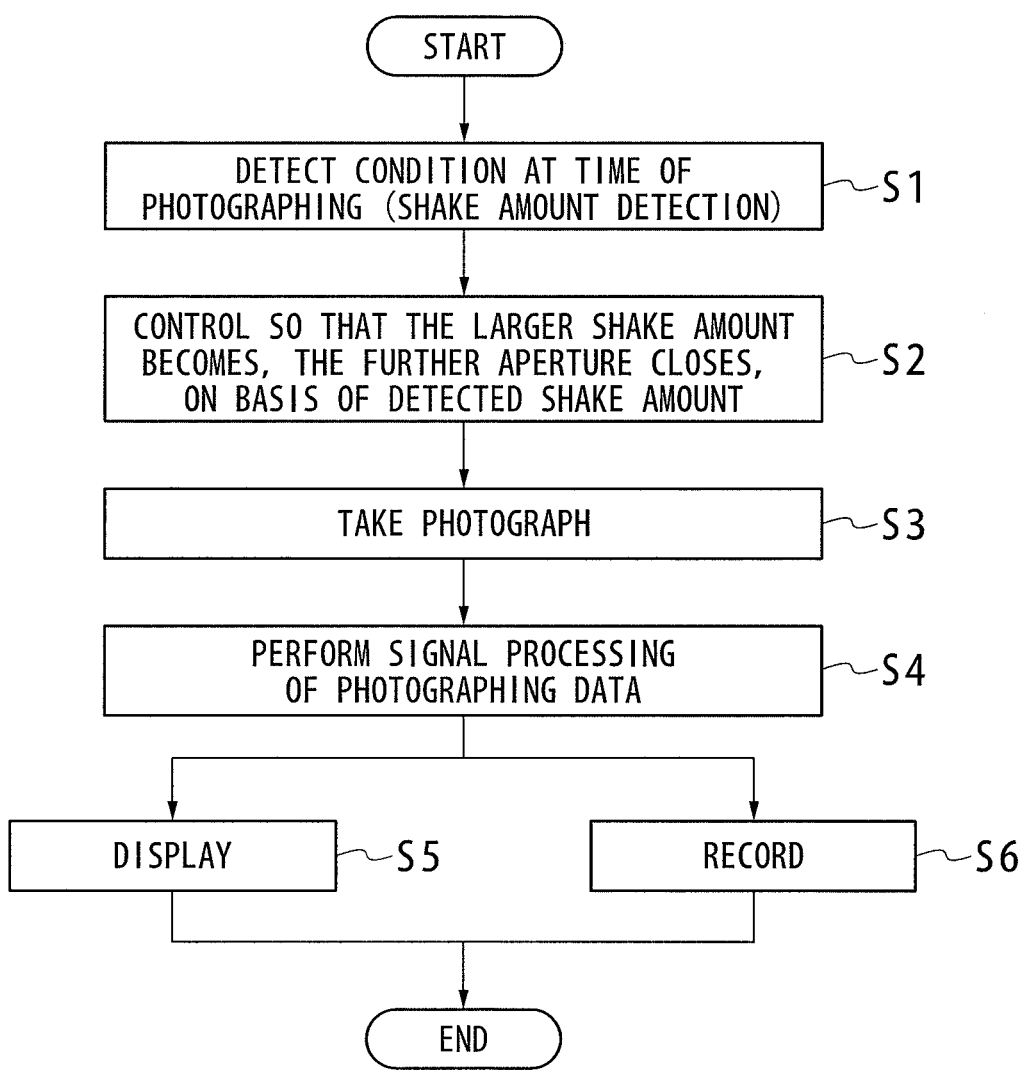
FIG. 5 is a flowchart of imaging processing in accordance with a first embodiment.

FIG. 5 is a flowchart of imaging processing performed by the monocular stereoscopic imaging device 1. Note that processing such as creation of the defocus map, storing of the restoration filter, restoration processing of the viewpoint image using the restoration filter, and output processing of the restored viewpoint image can be performed by an information-processing device other than the monocular stereoscopic imaging device 1, such as a personal computer. A program that causes the stereoscopic imaging device 1 and another information-processing device to perform the processing shown by the following flowchart is stored in a non-temporary computer-readable medium, such as a ROM or a CD-ROM. The processing is started in response to a half-push of a shutter button.

In S1, the CPU 40 controls the shake-amount detector 71 to detect the amount of shake. The detected amount of shake includes the amount of camera shake ωx in a yaw direction (horizontal direction) and the amount of camera shake ωy in a pitch direction (vertical direction).

In S2, the CPU 40 controls the aperture driving unit 34 to set the amount of aperture corresponding to the amount of shake detected by the shake-amount detector 71. The aperture driving unit 34 controls the opening of the aperture 14 so as to reach the set amount of aperture. The amount of aperture Y depending on this amount of shake (ωx, ωy) has a relation that the larger the scalar quantity of the shake becomes, the smaller the amount of aperture becomes (the closer the amount of aperture becomes to the small-aperture side) than the amount of aperture according to a predetermined program diagram. The relation between the amount of shake and the amount of aperture is expressed by, for example, a function Y in which a primary differential coefficient is negative and parameters are (ωx, ωy). For example, the relation is expressed by Y=[Δxωx+Δyωy]+A, where each of Ax and Ay is a positive constant and A is the amount of aperture defined in accordance with normal aperture processing. In other ward, the larger the scalar quantity of the shake becomes, the larger the amount of aperture becomes than the normal amount of aperture. When the amount of aperture Y is expressed by an F value, the larger the scalar quantity of the shake becomes, the larger the F value becomes than the value determined by the normal aperture processing. For example, if the F value used in the normal aperture processing is F1.4 (strong parallax), the range used in the aperture processing of this step is, for example, F2.8 (normal parallax) to F5.6 (weak parallax).

In S3, the CPU 40 controls the CCD 16 to obtain viewpoint image data for output, in response to the direction of starting imaging by a full-push of the shutter button.

In S4, the restoration unit 63 determines the image height and the amount of defocus of each small region that are set to each viewpoint image. The determination of the image height of each small region is performed by calculating the shortest distance from the center of the image to each small region. The determination of the amount of defocus is performed with respect to each viewpoint image on the basis of the defocus map created by the defocus-map creation unit 61. The restoration unit 63 selects, from the restoration-filter storage unit 62, the restoration filters corresponding to the image height and the amount of defocus of the small regions determined with respect to each viewpoint image. The restoration unit 63 deconvolves the small regions by using the restoration filters selected with respect to each small region of each viewpoint image to restore the small regions of the corresponding viewpoint image.

The restoration unit 63 generates a stereoscopic view image from the viewpoint image in which restoration has been made from degradation state and newly stores the image in the VRAM 50 as the stereoscopic view image after restoration. The viewpoint image in which restoration has been made from degradation state may be displayed on the liquid crystal monitor 30 (S5) or may be output to, or compressed and recorded in the memory card 54 (S6).

In S5, the stereoscopic view image after restoration stored in the VRAM 50 is output to the liquid crystal monitor 30, and an excellent 3D object image is displayed on the screen of the liquid crystal monitor 30. Thus, the restoration timing is preferably performed before the stereoscopic view image is output to the liquid crystal monitor 30. Note that the stereoscopic view image after restoration in the VRAM 50 may be output to another stereoscopic view display other than the liquid crystal monitor 30.

In S6, the viewpoint image in which restoration has been made from degradation state is output to, or compressed and recorded in the memory card 54. When the stereoscopic view image after restoration recorded in the memory card 54 is reproduced on various stereoscopic view displays, for example, the liquid crystal monitor 30 and so on, an excellent 3D object image can be similarly displayed.

Through the above processing, an image having a weaker parallax than a parallax obtained by the normal aperture processing is obtained at the time of occurrence of a shake. FIGS. 6(A) and 6(B) are image views showing a condition in which parallaxes of the main image and the sub-image vary by each aperture F value. FIG. 6(A) shows a case in which an F value is large (dark), whereas FIG. 6(B) shows a case in which the F value is small (bright).

In FIGS. 6(A) and 6(B), although parallaxes (phase difference) of the main image and the sub-image of the main object (in this example, a person) at the position where focus is achieved (focus position) are both 0, the darker the F value becomes, the smaller the parallax of the back ground becomes (FIG. 6(A)), and the brighter the F value becomes, the larger the parallax of the back ground becomes (FIG. 6(B)).

In this way, the further closing of the aperture 14 as the amount of shake becomes larger deepens a focus depth and decreases the amount of parallax, so that a stereoscopic effect is weakened when the amount of shake is large, thereby reducing an influence on viewers.

Second Embodiment

Figure 7:
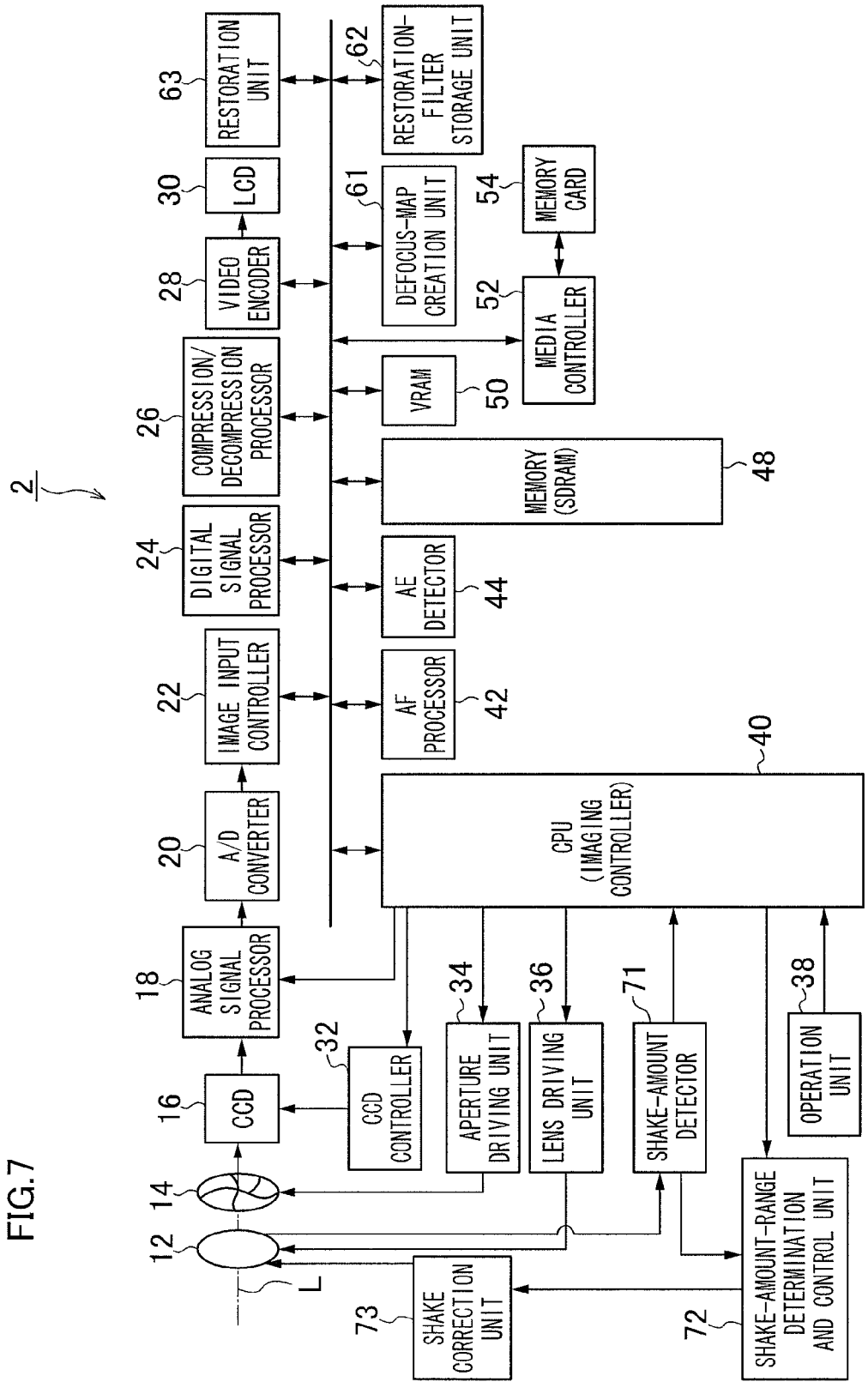
FIG. 7 is a block diagram of a monocular stereoscopic imaging device in accordance with a second embodiment.

FIG. 7 is a block diagram of a monocular stereoscopic imaging device 2 in accordance with a second embodiment. The same elements as the first embodiment shown in FIG. 1 will be denoted by the same reference numerals, and detailed description thereof will be omitted.

This monocular stereoscopic imaging device 2 further includes a shake-amount-range determination and control unit 72 and a shake correction unit 73. The shake correction unit 73 optically corrects a shake of an object image corresponding to the amount of shake in a yaw direction and a pitch direction detected by the shake-amount detector 71, according to the control of the shake-amount-range determination and control unit 72. For example, the shake correction unit 73 controls a yaw-direction actuator and a pitch-direction actuator to move the lens 12 in the direction negating the detected amount of shake, thereby preventing an image shake (lens-shift method). As a method of the optical shake correction for use in the shake correction unit 73, various methods can be adoptable. For example, the shake correction unit 73 may control the yaw-direction actuator and the pitch-direction actuator to move the CCD 16 in the direction negating the detected amount of shake, thereby preventing the image shake (image-sensor-shift method).

Figure 8:
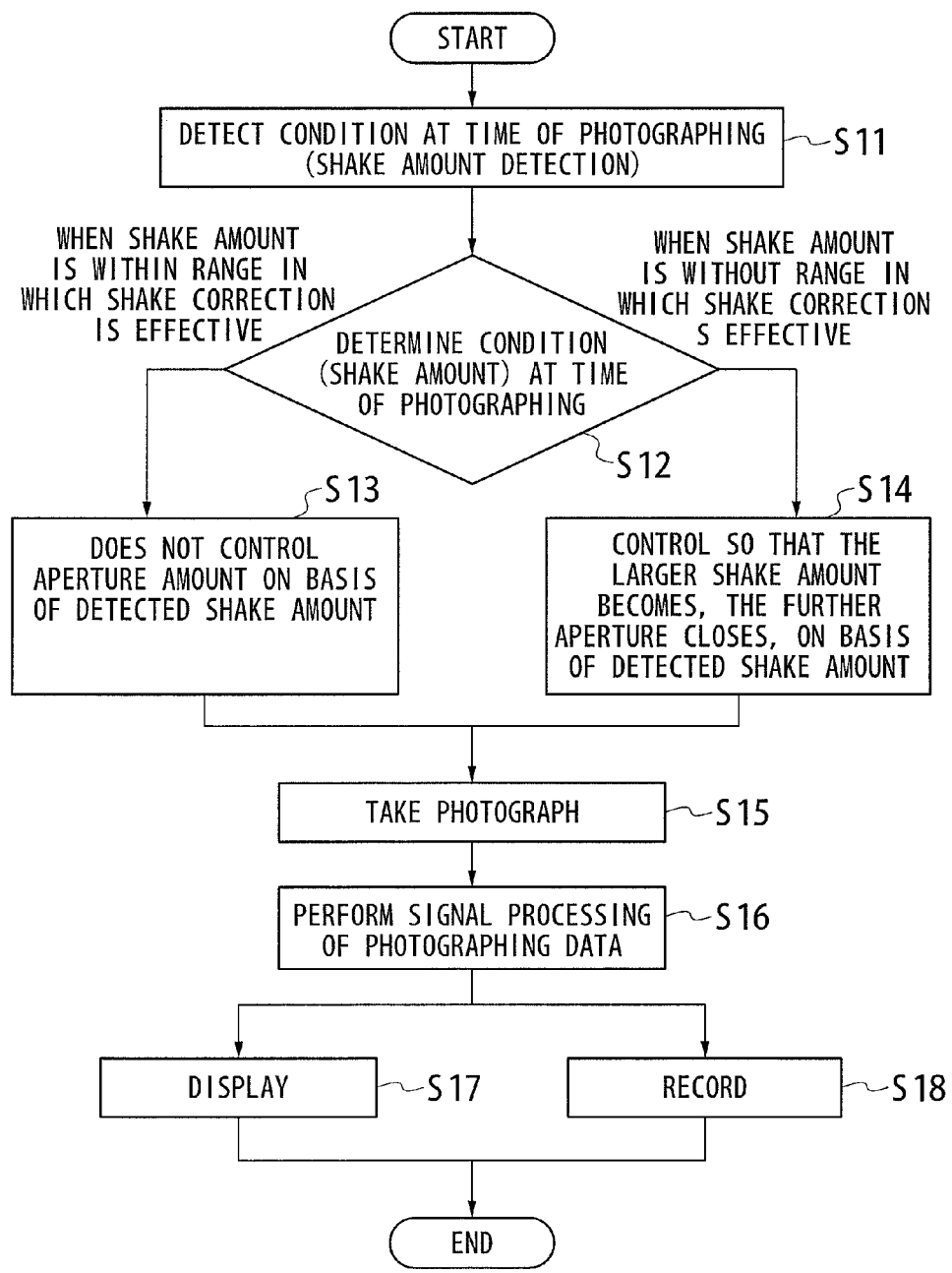
FIG. 8 is a flowchart of imaging processing in accordance with a second embodiment.

FIG. 8 is a flowchart of imaging processing performed by the monocular stereoscopic imaging device 2. The processing is started in response to a half-push of a shutter button.

S11 is the same as S1.

In S12, the shake-amount-range determination and control unit 72 determines whether or not the detected amount of shake falls within a range capable of shake correction. When Yes, the procedure proceeds to S13, and when No, the procedure proceeds to S14. The range capable of shake correction is an operational range of the optical shake correction. For example, the range is the operational range of the yaw-direction actuator and the pitch-direction actuator.

In S13, the shake-amount-range determination and control unit 72 controls the shake correction unit 73 to correct the image shake corresponding to the detected amount of shake, and performs the normal aperture control.

S14 is the same as the S2. In this case, the shake correction is not performed.

S15 to S18 are the same as S3 to S6.

In this way, within the range of amount of shake in which the shake correction is not effective, the further closing of the aperture 14 as the amount of shake becomes larger deepens a focus depth, so that an influence of the shake on the parallax variation can be reduced. On the other hand, within the range of amount of shake in which the shake correction is effective, the shake correction is performed to prevent the image shake.

Third Embodiment

Figure 9:
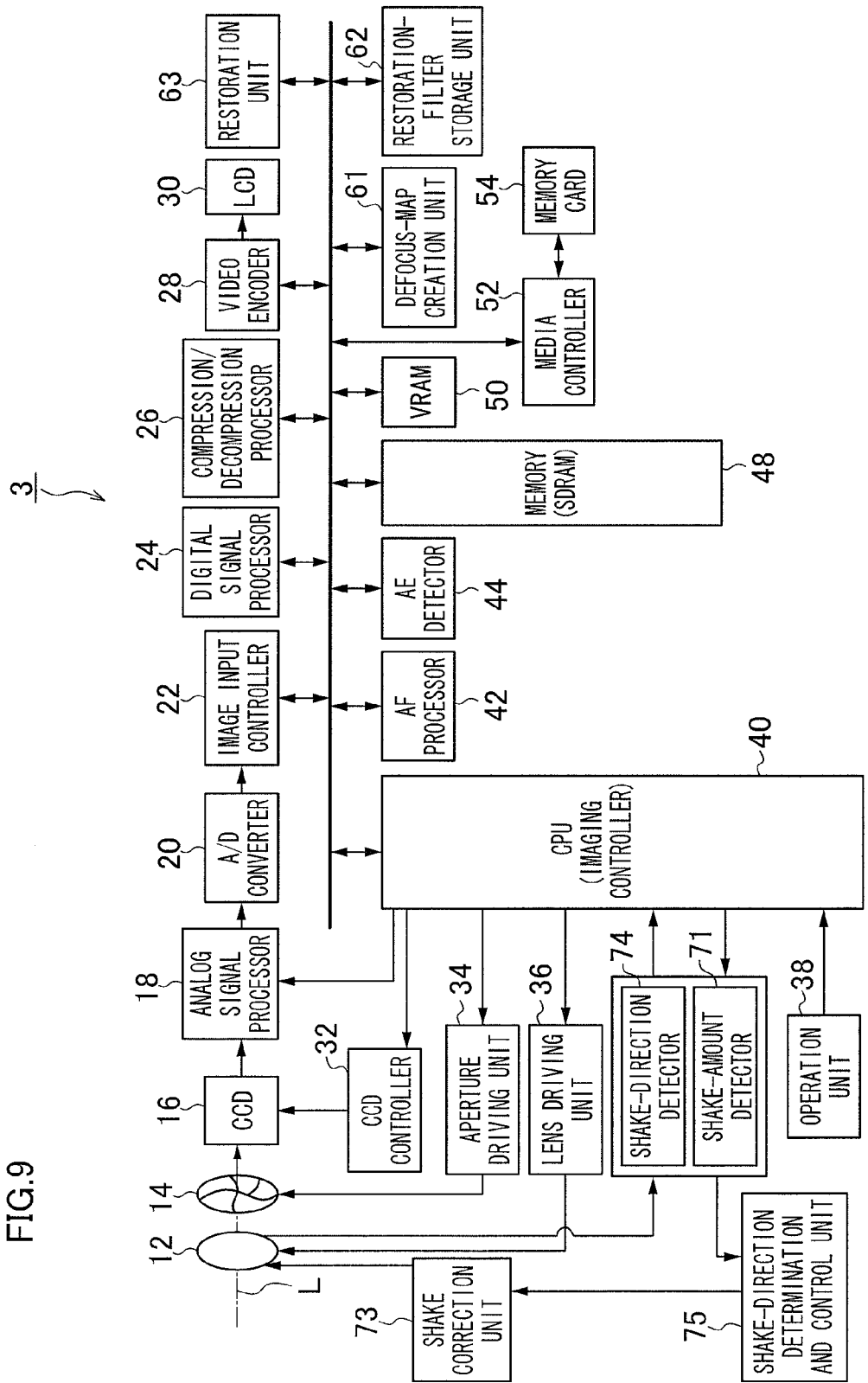
FIG. 9 is a block diagram of a monocular stereoscopic imaging device in accordance with a third embodiment.

FIG. 9 is a block diagram of a monocular stereoscopic imaging device 3 in accordance with a third embodiment. The same elements as the first embodiment and the second embodiment shown in FIG. 1 will be denoted by the same reference numerals, and detailed description thereof will be omitted.

The monocular stereoscopic imaging device 3 further includes a shake-direction detector 74 and a shake-direction determination and control unit 75. The shake-direction detector 74 detects a direction in which a shake occurs (a yaw direction and/or a pitch direction).

Figure 10:
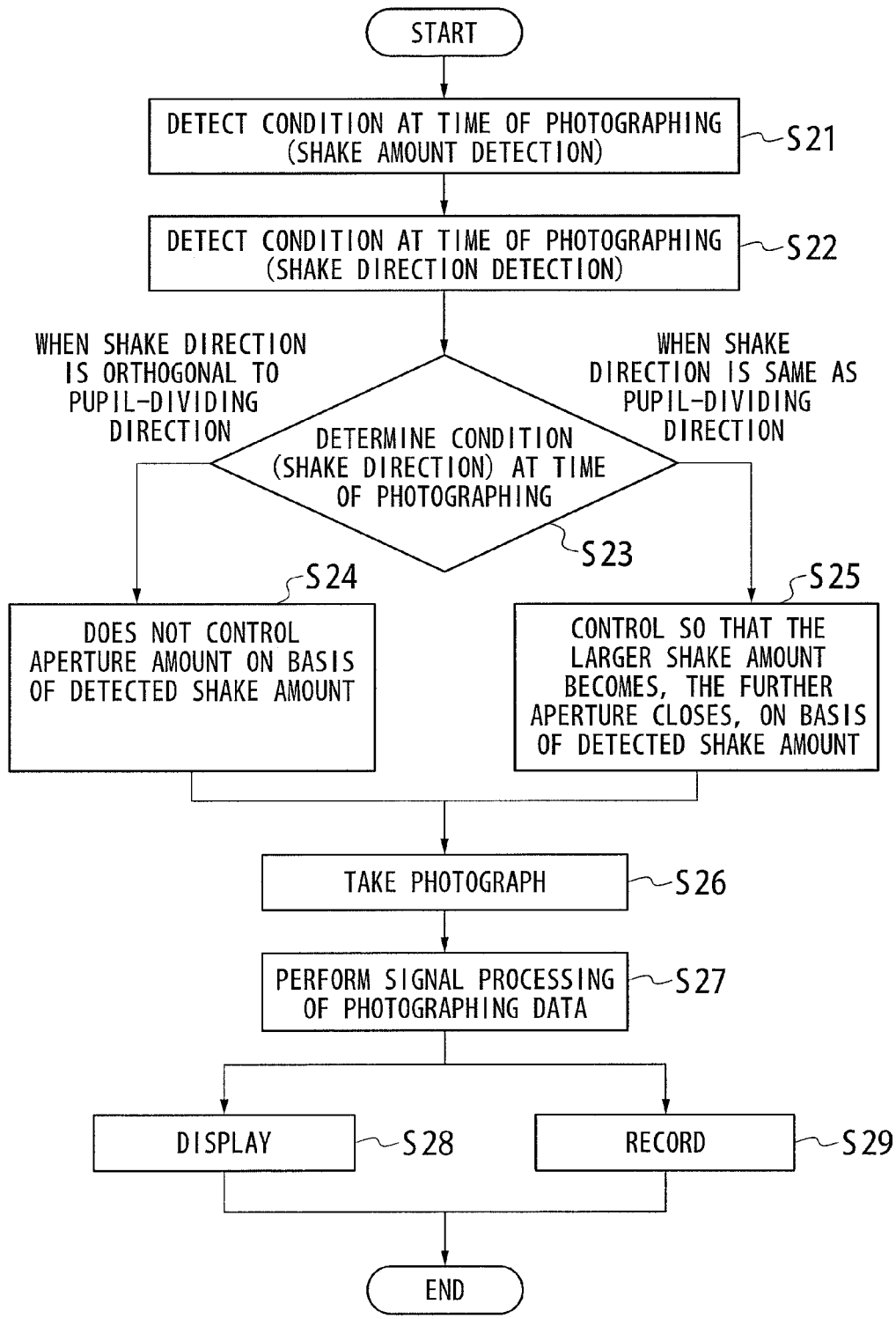
FIG. 10 is a flowchart of imaging processing in accordance with a third embodiment.

FIG. 10 is a flowchart of imaging processing performed by the monocular stereoscopic imaging device 2.

S21 is the same as the S1.

In S22, the shake-direction detector 74 detects, as a shake direction, the direction corresponding to the larger one of the amount of shake in the yaw direction and the amount of shake in the pitch direction detected by the shake-amount detector 71. If the amount of shakes in both the directions is the same, the shake-direction detector 74 detects a pupil-dividing direction as the shake direction.

In S23, the shake-direction determination and control unit 75 determines whether or not the shake direction detected by the shake-direction detector 74 is different from the pupil-dividing direction. When Yes (the both are different), the procedure proceeds to S24, and when No (the both are matched), the procedure proceeds to S25. For example, if the pupil-dividing direction is a horizontal direction, the procedure proceeds to S24 when the shake direction is the yaw direction, and the procedure proceeds to S25 when the shake direction is the pitch direction.

S24 to S29 are the same as S13 to S18. In S24, the normal aperture control is performed. In other words, a photographic Ev value is calculated from an electrical signal output from the CCD 16, the amount of aperture is controlled according to, for example, the photographic Ev value and a program diagram, and a luminance level of an object image is controlled to be at an appropriate luminance level. Moreover, in S24, the shake-amount-range determination and control unit 72 may control the shake correction unit 73 to correct an image shake corresponding to the detected amount of shake.

In the case where the shake occurs in the same direction as the pupil-dividing direction, since it is thought that the shake has a strong influence on a vision of a stereoscopic image, the aperture is further closed to reduce the influence of the shake on the parallax. In contrast, in the case where the shake occurs in the direction orthogonal to the pupil-dividing direction, since it is thought that the influence of the shake on the vision of the stereoscopic image is not so strong, only the shake correction is performed.

Fourth Embodiment

The processing of the second embodiment and the third embodiment can be combined. More specifically, the shake-direction determination and control unit 75 initially determines whether or not the shake direction detected by the shake-direction detector 74 is different from the pupil-dividing direction. When the shake-direction determination and control unit 75 determines that the shake direction ≠ the pupil-dividing direction, the procedure proceeds to S13. Processing after this is the same as the processing of the second embodiment.

When the shake-direction determination and control unit 75 determines that the shake direction=the pupil-dividing direction, the shake-amount-range determination and control unit 72 determines whether or not the detected amount of shake falls within a range capable of shake correction. When Yes, the procedure proceeds to S13. Processing after this is the same as the processing of the second embodiment. When No, the procedure proceeds to S25. Processing after this is the same as the processing of the third embodiment.

Thus, only in the case where the shake direction=the pupil-dividing direction and the amount of shake falls without the range capable of shake compensation, an influence on the parallax can be reduced by further closing the aperture than usual.

REFERENCE SIGNS LIST

12: imaging lens, 14: aperture, 16: CCD, 61: defocus-map creation unit, 62: restoration-filter storage unit, 63: restoration unit, 71: shake-amount detector, 72: shake-amount-range determination and control unit, 73: shake correction unit, 74: shake-direction detector, 75: shake-direction determination and control unit

The invention claimed is:

1. A stereoscopic imaging device, comprising:
an imaging element that outputs a pair of images having a parallax, by pupil-dividing a light flux from an object into two light fluxes and imaging the two light fluxes onto two photoelectric conversion element groups corresponding to each flux to photoelectrically convert the two light fluxes;
an aperture that adjusts an amount of light flux imaged onto the photoelectric conversion element groups of the imaging element;
a light-quantity detector detecting the amount of light flux;
an aperture controller capable of performing a first aperture control controlling an amount of opening of the aperture so that a desired parallax is obtained according to the amount of light detected by the light-quantity detector; and
a shake detector detecting an amount of shake of an object image at a time of photographing an image by the imaging element,
wherein the aperture controller performs a second aperture control in which the larger the amount of shake detected by the shake detector becomes, the further the amount of opening of the aperture decreases than the amount of opening required for the first aperture control.

2. The stereoscopic imaging device according to claim 1, comprising:
a shake corrector optically correcting a shake of the object image according to the amount of shake detected by the shake detector; and
a shake-amount determinator determining whether or not the amount of shake detected by the shake detector falls within a range capable of shake correction by the shake corrector,
wherein the aperture controller performs the second aperture control when the shake-amount determinator determines that the amount of shake falls without the range capable of shake correction.

3. The stereoscopic imaging device according to claim 2, wherein the shake corrector optically corrects the shake of the object image when the shake-amount determinator determines that the amount of shake falls within the range capable of shake correction, and the aperture controller performs the first aperture control when the shake-amount determinator determines that the amount of shake falls within the range capable of shake correction.

4. The stereoscopic imaging device according to claim 3, comprising:
  a shake-direction detector detecting a direction of the shake of the object image; and
  a shake-direction determinator determining whether or not the direction of the shake detected by the shake-direction detector is coincident with a direction of the pupil-dividing,
  wherein the aperture controller performs the second aperture control when the shake-direction determinator determines that the direction of the shake is coincident with the direction of the pupil-dividing.

5. The stereoscopic imaging device according to claim 4, wherein the aperture controller performs the first aperture control when the shake-direction determinator determines that the direction of the shake is not coincident with the direction of the pupil-dividing.

6. The stereoscopic imaging device according to claim 2, comprising:
  a shake-direction detector detecting a direction of the shake of the object image; and
  a shake-direction determinator determining whether or not the direction of the shake detected by the shake-direction detector is coincident with a direction of the pupil-dividing,
  wherein the aperture controller performs the second aperture control when the shake-direction determinator determines that the direction of the shake is coincident with the direction of the pupil-dividing.

7. The stereoscopic imaging device according to claim 6, wherein the aperture controller performs the first aperture control when the shake-direction determinator determines that the direction of the shake is not coincident with the direction of the pupil-dividing.

8. The stereoscopic imaging device according to claim 1, comprising:
  a shake-direction detector detecting a direction of the shake of the object image; and
  a shake-direction determinator determining whether or not the direction of the shake detected by the shake-direction detector is coincident with a direction of the pupil-dividing,
  wherein the aperture controller performs the second aperture control when the shake-direction determinator determines that the direction of the shake is coincident with the direction of the pupil-dividing.

9. The stereoscopic imaging device according to claim 8, wherein the aperture controller performs the first aperture control when the shake-direction determinator determines that the direction of the shake is not coincident with the direction of the pupil-dividing.

10. A stereoscopic imaging method, wherein a stereoscopic imaging device performs the steps of:
  outputting a pair of images having a parallax, by pupil-dividing a light flux from an object into two light fluxes and imaging the two light fluxes onto two photoelectric conversion element groups corresponding to each flux to photoelectrically convert the two light fluxes;
  adjusting an amount of light flux imaged onto the photoelectric conversion element groups by an amount of opening of an aperture;
  detecting the amount of light flux;
  performing a first aperture control controlling the amount of opening of the aperture so that a desired parallax is obtained according to the detected amount of light;
  detecting an amount of shake of an object image at a time of photographing the images; and
  performing a second aperture control in which the larger the detected amount of shake becomes, the further the amount of opening of the aperture decreases than the amount of opening required for the first aperture control.

11. A non-transitory computer-readable medium storing a stereoscopic imaging program, wherein a stereoscopic imaging device performs the steps of:
  outputting a pair of images having a parallax, by pupil-dividing a light flux from an object into two light fluxes and imaging the two light fluxes onto two photoelectric conversion element groups corresponding to each flux to photoelectrically convert the two light fluxes;
  adjusting an amount of light flux imaged onto the photoelectric conversion element groups by an amount of opening of an aperture;
  detecting the amount of light flux;
  performing a first aperture control controlling the amount of opening of the aperture so that a desired parallax is obtained according to the detected amount of light;
  detecting an amount of shake of an object image at a time of photographing the images; and
  performing a second aperture control in which the larger the detected amount of shake becomes, the further the amount of opening of the aperture decreases than the amount of opening required for the first aperture control.

* * * * *